O. TARDIF.
POTATO DIGGER.
APPLICATION FILED DEC. 11, 1908.
972,037.
Patented Oct. 4, 1910.
3 SHEETS—SHEET 1.
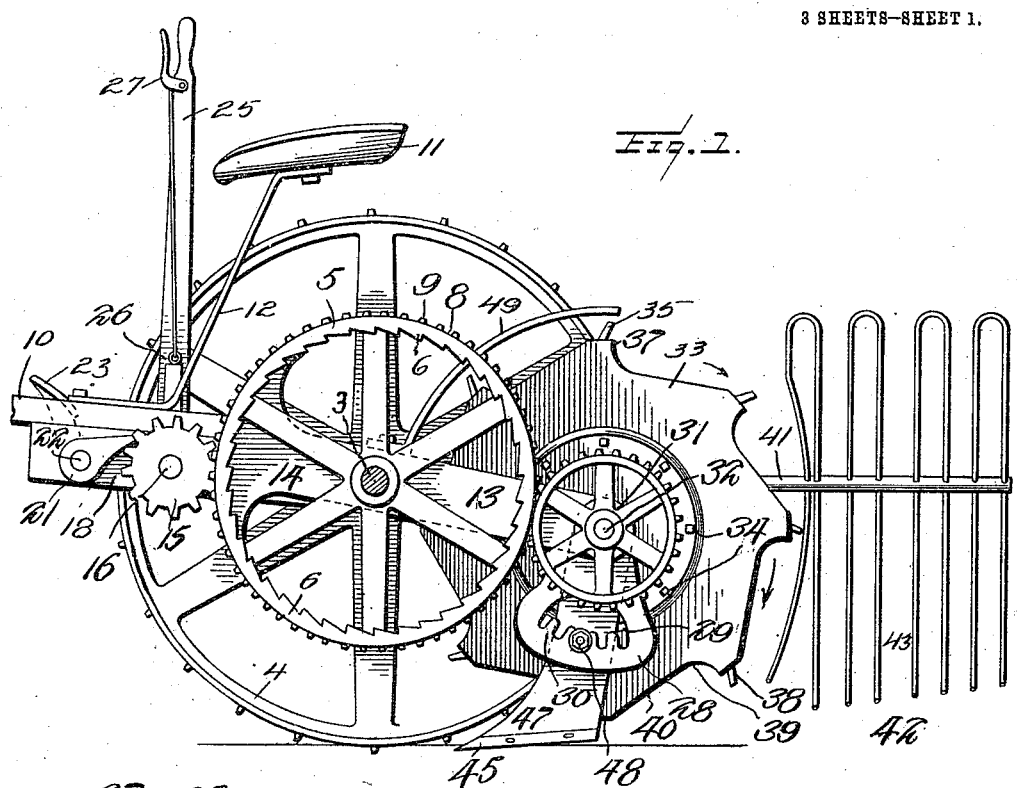
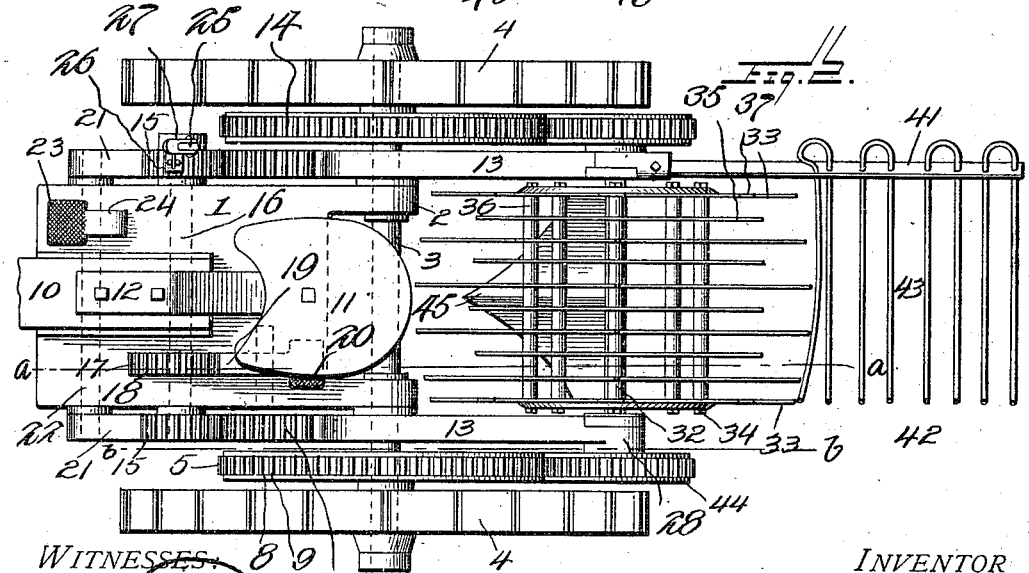
WITNESSES:
INVENTOR
Omeril Tardif
BY
Victor J. Evans
Attorney O. TARDIF.
POTATO DIGGER.
APPLICATION FILED DEC. 11, 1908.
972,037.
Patented Oct. 4, 1910.
3 SHEETS—SHEET 2.
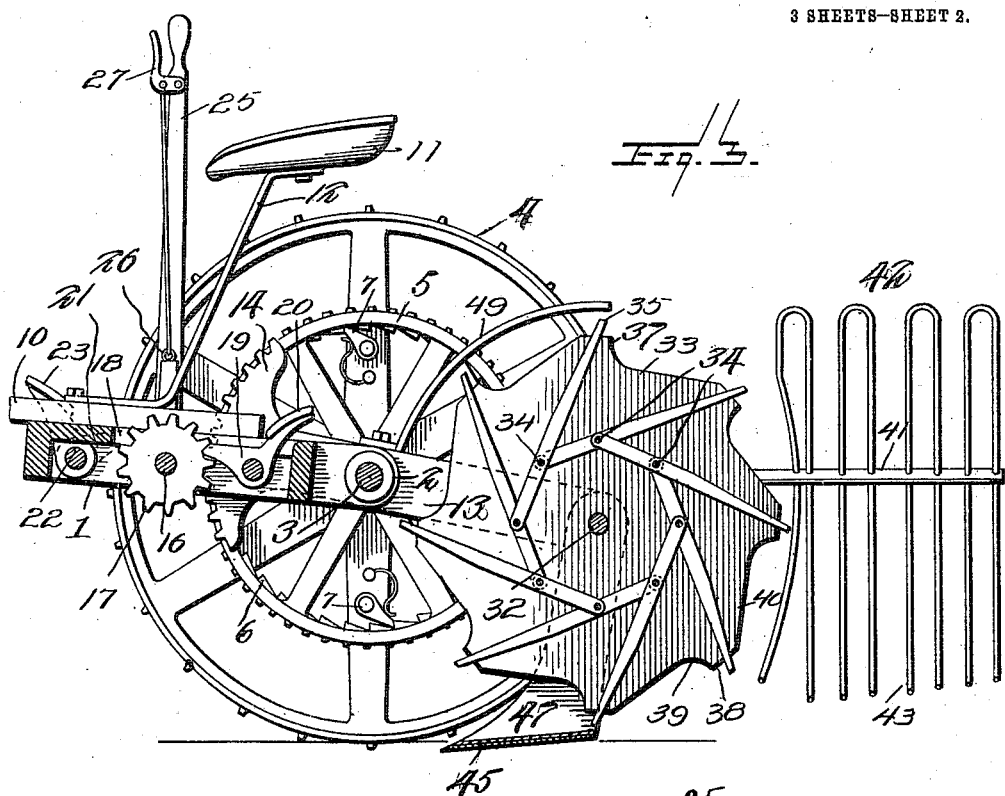
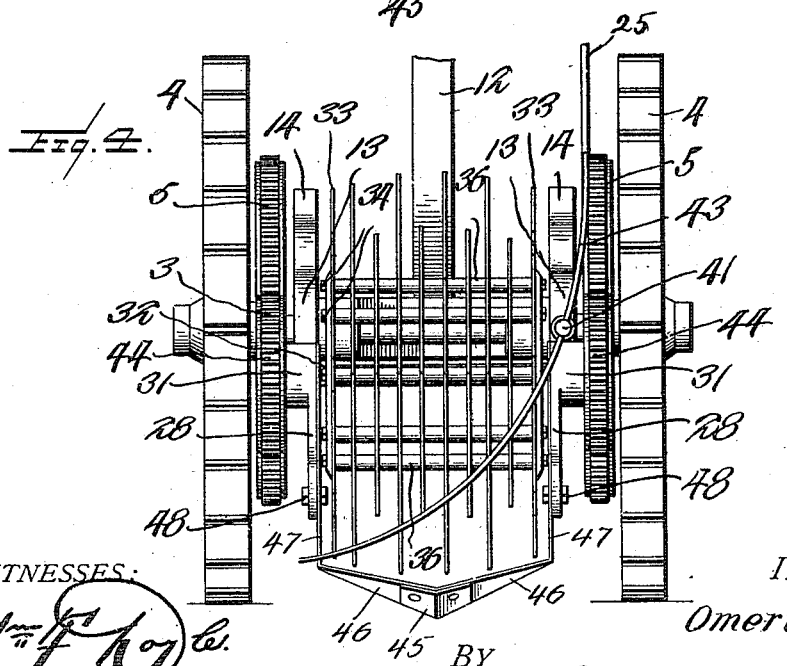
WITNESSES:
INVENTOR
Omeril Tardif.
BY
Victor J. Evans
Attorney

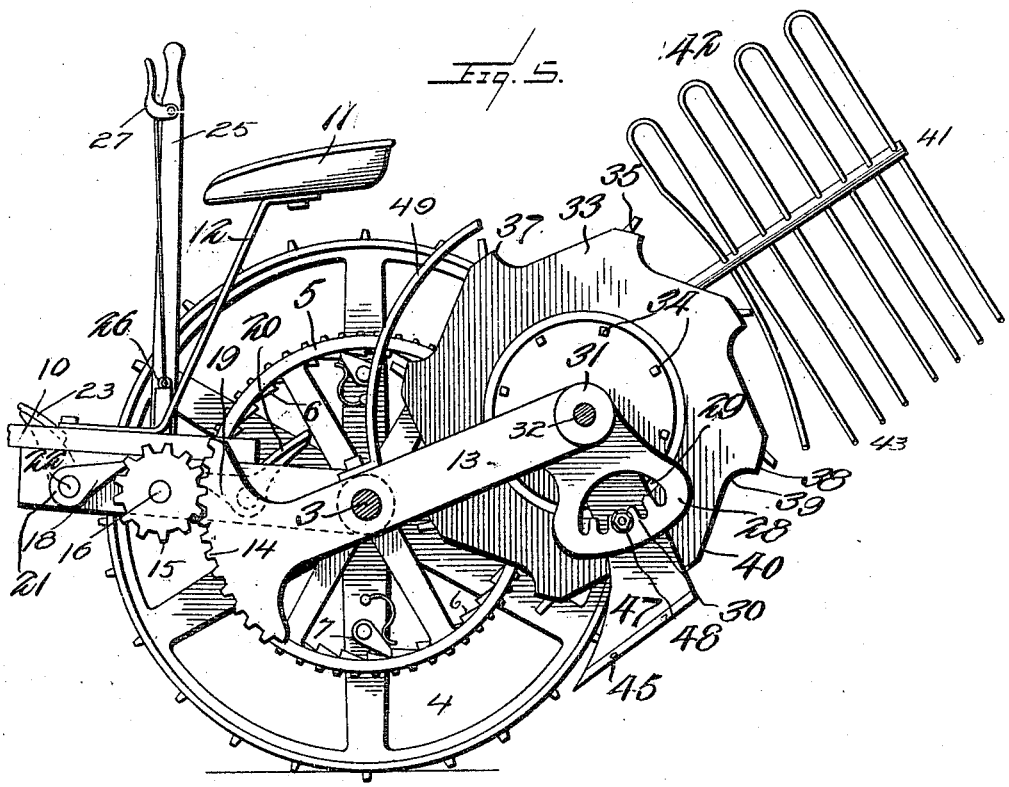
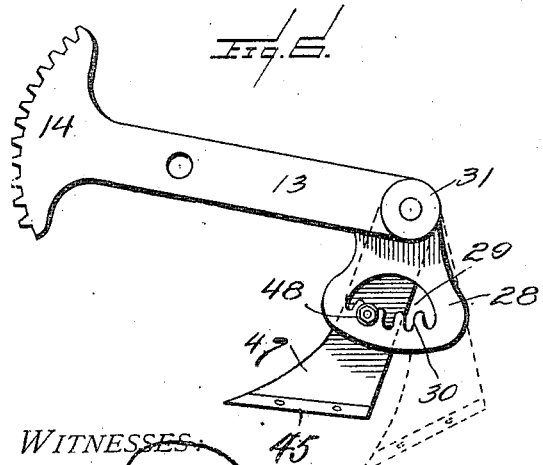
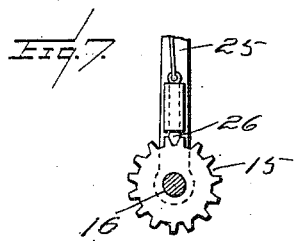
INVENTOR
Omeril Tardif.

UNITED STATES PATENT OFFICE.

OMERIL TARDIF, OF PLESSISVILLE, QUEBEC, CANADA.

POTATO-DIGGER.

972,037.  Specification of Letters Patent.  Patented Oct. 4, 1910.

Application filed December 11, 1908. Serial No. 467,096.

*To all whom it may concern:*

Be it known that I, OMERIL TARDIF, a subject of the King of Great Britain, residing at Plessisville, in the Province of Quebec and Dominion of Canada, have invented new and useful Improvements in Potato-Diggers, of which the following is a specification.

This invention relates to an improved machine for digging potatoes, and it has for its object to produce a device of this class which shall possess superior advantages in point of simplicity, durability and general efficiency, and with these and other ends in view, which will be readily understood from the following description, taken in connection with the drawings hereto annexed, the invention consists in the improved construction and novel arrangement and combination of parts which will be hereinafter fully described and particularly pointed out in the claims.

In the accompanying drawings: Figure 1 is a side elevation of a potato digging machine constructed in accordance with my invention with the near wheel removed and an axle shaft shown in cross section. Fig. 2 is a plan of the same. Fig. 3 is a vertical longitudinal sectional view on the plane indicated by the line $a$—$a$ of Fig. 2. Fig. 4 is a rear elevation of the same. Fig. 5 is a vertical longitudinal sectional view on the plane indicated by the line $b$—$b$ of Fig. 2 and showing the digging mechanism raised.
Fig. 6 is a detail elevation of one of the sector levers and of the scoop or shovel. Fig. 7 is a detail elevation of the operating lever which raises and lowers the potato digging mechanism and also of the pinion with which such lever coacts. Fig. 8 is a detail elevation of one of the mortise gears.

The frame or platform 1 which is preferably of the form here shown or may be of any other suitable form, has bearings 2 at its rear end for the axle shaft 3. The said axle shaft is provided on its ends with traction and supporting wheels 4 which are loose thereon. The axle shaft is further provided near its ends and on the inner sides of the traction wheels with gear wheels 5 which are provided on their inner sides with ratchet teeth 6, said ratchet teeth being engaged by spring-pressed pawls 7 which are mounted on the inner sides of the traction wheels. Hence the said gears 5 are revolved by the traction wheels 4 when the machine advances and the said traction wheels are permitted to rotate at different rates of speed as when the machine is turned, as will be understood. The gears 5 are mortise gears, that is to say, the spaces 8 between their spurs or teeth 9, are open at their inner sides so that material such as earth which might tend to clod said gears will be forced through the said openings and hence prevented from interfering with the action of the gears.

A tongue or pole 10 has its rear end bolted on the frame or platform 1. The seat 11 for the driver is supported by a spring 12, which spring is secured on the rear portion of the tongue as shown. On opposite sides of the frame or platform 1 are longitudinally disposed sector levers 13 which are pivotally mounted on the axle shaft 3 and are provided at their front ends with sector gears 14. Said sector gears are engaged by pinions 15 on a set shaft 16, the said shaft having its bearings in the frame or platform 1 and the said pinions being on opposite sides of said frame or platform. A pinion 17 is also secured to the said set shaft and projects through a slot 18 in the frame or platform and is engaged on its rear side by a pawl 19, the said pawl having a rearwardly and upwardly extending foot piece or tread 20 whereby the said pawl may be readily disengaged from the pinion 17 when the driver presses with one foot downwardly on the said tread or arm 20. The pinions 15 are engaged on their front sides by pawls 21, which pawls are secured to a rock shaft 22, said rock shaft having its bearings in the frame or platform 1. A foot or tread lever 23 is provided which is attached to the rock shaft 22 and projects upwardly through and operates in a slot 24 in the frame or platform 1. This lever 23 may be, as will be understood, readily operated by one foot of the driver to cause the pawls 21 to disengage the pinions 15. A set lever 25 is pivotally mounted on one end of the set shaft 16 and has a locking dog 26 of usual construction which normally engages one of the pinions 15 so as to lock said set lever to said pinion and hence also to the set shaft 16. A suitable trip 27 of usual construction is carried by the set lever and by means of which the dog may be readily disengaged from the said pinion 15 when necessary.

The sector levers 13 are provided at their rear ends with downwardly extending sector arms 28 each of which has an opening 29 the lower side of which is formed by a sector gear 30. The rear ends of the said sector levers are further provided with bearings 31 for a shaft 32 which shaft constitutes an element of a revolving rake which is employed to elevate the up-rooted potatoes, separate them from the vines and adhering earth and to then throw the potatoes rearwardly so that they fall on the ground in rear of the machine in straight rows parallel with the rows in which they grew and so that they can be readily picked up and placed in sacks or other receptacles. The said revolving rake mechanism further consists of a pair of side disks 33 carried by said shaft 32 and disposed near the inner sides of the sector levers, bolt rods 34 which connect said disks together and rake teeth 35 which are disposed tangentially to a circle concentric with the shaft 32 and each of which is secured at and near its inner end on two of the bolt rods 34, said bolt rods passing through openings in the said rake teeth and the spaces between the rake teeth being filled by collars 36 which are placed on the said bolt rods. The disks 33 are preferably of the form shown in Figs. 1, 3 and 5 with their edges ground to form teeth 37 each tooth presenting a truncated point 38, a curved front edge 39 and a straight tangential edge 40.

To the rear end of one of the sector levers is connected the longitudinal bar 41 of a fender 42, the said fender having inverted U-shaped teeth 43 which are passed through and secured in openings in the said bar 41 and are laterally curved as shown in Fig. 4 so that the said fender teeth extend across the space in rear of the revolving rake mechanism. On the ends of the shaft 32 are mortise gears 44 which engage the mortise driving gears 5. Said gears 44 are much smaller than the gears 5 and hence when the machine is in motion the revolving rake mechanism is driven at comparatively high rate of speed and in the direction indicated by the arrow in Fig. 1. The scoop or plow 45 is of the form shown so that it presents downwardly converging bottom sides 46. It also has standards 47 at its sides which standards are pivoted at their upper ends on the shaft 32 and bear against the inner sides of the sector arms 28 of the levers 13. Adjusting bolts 48 are provided which project from the outer sides of the standards of the plow or scoop and engage certain of the teeth of the sectors 30 so that the plow or scoop may be set at any desired angle with respect to the sector levers 13.

When the machine is in operation with the scoop or plow, the revolving rake mechanism and the fender in lowered position, as shown in Figs. 1 and 3, the scoop or plow runs under the potatoes and serves to uproot them and bring them to the surface where they are caught by the teeth of the revolving rake mechanism, carried upwardly thereby and thrown rearwardly from the upper side of the rake mechanism together with the earth and vines or other trash. Owing to the weight of the potatoes, they are thrown farther to the rear of the revolving rake mechanism than the earth or trash which become separated therefrom by the action of the revolving rake mechanism and hence the potatoes are effectually separated from the trash and earth. The potatoes fall on the fender and the fender serves to guide them by gravity down to one side of the path and in the rear of the machine so that the potatoes are placed by the machine in a row parallel with the row from which they were dug and on the surface where they may be readily picked up and placed in sacks or other receptacles. A hood 49 is shown attached to the upper sides of the sector levers and disposed over the front side of the revolving rake mechanism, said hood serving to prevent the potatoes from being thrown forward from the rake mechanism. The pawls 19, 21, by coaction with the pinions of the set shaft and because of the engagement of the pinions 15 with the sector gears 14 of the sector levers hold the said sector levers and hence also the scoop or plow, the revolving rake mechanism and the fender in any desired position with the plow running at the required depth in the soil. When it is desired to raise or lower the plow, the revolving rake mechanism and the fender, the driver by means of the levers 20, 23, disengages the pawls from the pinions of the set shaft and he then, by means of the lever 25 the dog 26 thereof being engaged with one of the pinions 15, turns the set shaft as far as may be required to raise or lower the plow or scoop, revolving rake mechanism and fender to the desired extent. It will be understood that when the machine is not in operation and is being drawn from one point to another, the plow or scoop, revolving mechanism and fender will be raised, as shown in Fig. 5.

What is claimed is:—

1. A potato digging machine comprising a frame having an axle shaft and traction wheels on said axle shaft; a set shaft mounted on the frame and having pinions, a set lever and means to lock said set shaft; levers pivotally mounted on the axle shaft and having sectors engaged by the pinions, a revoluble rake mechanism having a shaft mounted in bearings in said levers, a plow under the rake mechanism having standards at its sides pivoted on the rake shaft, means to secure the plow in an adjusted position with respect to said levers and driving means for the rake mechanism.

2. A potato digging machine comprising a frame having an axle shaft and traction wheels on said axle shaft; levers pivotally mounted on the axle shaft and having depending arms at their rear ends, a revoluble rake mechanism having a shaft mounted in bearings in said levers, a plow under the rake mechanism having standards at its sides pivoted on the rake shaft, means to secure the plow in an adjusted position with respect to the arms of said levers, a driving means for the rake mechanism and means coacting with said levers to simultaneously raise or lower the plow and the rake mechanism.

3. In a machine of the class described, in combination with pivotally mounted lever arms movable in a vertical plane, a plow having standards pivotally connected to said lever arms depending therefrom and adjustable angularly with respect thereto, a revolving rake mechanism also carried by said lever arms and disposed above said plow and means to raise and lower said lever arms.

4. A potato digging machine comprising a frame having an axle shaft and traction wheels on said axle shaft, gears on and revoluble with said axle shaft, levers pivotally mounted on the axle shaft, a revoluble rake mechanism having a shaft mounted in bearings in said levers and provided with gears engaging those of the axle shaft and driven thereby, a plow under said rake mechanism and connected to and carried by said levers and means to raise and lower said levers to raise and lower said rake mechanism and said plow.

5. A potato digging machine comprising a frame having traction elements, levers pivotally connected to the frame, a revoluble rake mechanism carried by said levers, a plow under said rake mechanism and also carried by said levers, means to revolve the rake mechanism, means to raise and lower said levers and hence also raise and lower said rake mechanism and said plow, and a fender attached to one of said levers and disposed in rear of said rake mechanism and said plow.

In testimony whereof I affix my signature in presence of two witnesses.

OMERIL TARDIF.

Witnesses:
　J. H. Dutil,
　Wm. R. Michaud.